United States Patent
Mackin

(10) Patent No.: US 12,457,997 B2
(45) Date of Patent: Nov. 4, 2025

(54) POULTRY BROODER

(71) Applicant: Bird-X, Inc., Elmhurst, IL (US)

(72) Inventor: Michael P. Mackin, Chicago, IL (US)

(73) Assignee: BIRD-X, INC., Elmhurst, IL (US)

(*) Notice: Subject to any disclaimer, the term of this patent is extended or adjusted under 35 U.S.C. 154(b) by 43 days.

(21) Appl. No.: 18/180,813

(22) Filed: Mar. 8, 2023

(65) Prior Publication Data

US 2023/0309517 A1    Oct. 5, 2023

Related U.S. Application Data

(60) Provisional application No. 63/323,734, filed on Mar. 25, 2022.

(51) Int. Cl.
*A01K 31/19* (2006.01)

(52) U.S. Cl.
CPC .................................. *A01K 31/19* (2013.01)

(58) Field of Classification Search
CPC ........ A01K 41/00; A01K 41/02; A01K 41/22; A01K 41/026; A01K 31/19; A01K 31/18; A01K 39/02; A01K 39/026; A01K 39/022; A01K 39/024; A01K 7/00; A01K 7/027; A01K 45/02
USPC ..... 119/300, 302, 303, 305, 72, 74, 72.5, 73
See application file for complete search history.

(56) References Cited

U.S. PATENT DOCUMENTS

| | | | | |
|---|---|---|---|---|
| 331,097 A | * | 11/1885 | Striong | A01K 39/026 |
| | | | | 119/77 |
| 769,942 A | * | 9/1904 | Gustav | A01K 9/00 |
| | | | | 119/71 |
| 1,403,731 A | * | 1/1922 | Beamer | A01K 39/02 |
| | | | | 119/73 |
| 1,485,395 A | * | 3/1924 | Hibbs | A01K 39/02 |
| | | | | 126/255 |
| 1,658,690 A | * | 2/1928 | Sanctuary | A01K 31/19 |
| | | | | 119/305 |
| 4,144,842 A | * | 3/1979 | Schlising | A01K 39/0113 |
| | | | | 119/52.3 |
| 5,829,386 A | * | 11/1998 | Wenstrand | A01K 39/026 |
| | | | | 119/77 |
| 2008/0245308 A1 | * | 10/2008 | Clark | A01K 7/027 |
| | | | | 119/74 |
| 2015/0230289 A1 | * | 8/2015 | Corona | B32B 38/1858 |
| | | | | 219/494 |
| 2022/0110299 A1 | * | 4/2022 | Eaglen | A01K 45/00 |

* cited by examiner

*Primary Examiner* — Joshua J Michener
*Assistant Examiner* — Nicole Paige Maccrate
(74) *Attorney, Agent, or Firm* — Benesch Friedlander Coplan & Aronoff LLP

(57) ABSTRACT

According to certain aspects of the present disclosure, a brooder is provided. The brooder includes a heater assembly comprising a heater base. A trough is disposed on the heater base and is formed by an inner wall and an outer wall. A tube is rotatably supported by the inner wall. A dome is adjustably supported on the tube.

12 Claims, 11 Drawing Sheets

POULTRY BROODER

CROSS-REFERENCE TO RELATED APPLICATIONS

The present application claims the benefit of priority under 35 U.S.C. § 119 from U.S. Provisional Patent Application Ser. No. 63/323,734 entitled "POULTRY BROODER," filed on Mar. 25, 2022, the disclosure of which is hereby incorporated by reference in its entirety for all purposes.

TECHNICAL FIELD

The present disclosure generally relates to poultry brooders, and more specifically relates to a poultry brooder with an adjustable dome and a controlled liquid supply.

BACKGROUND

Managing a poultry brooder can be a time intensive task. For example, the brooder needs to be supplied with adequate heat and water to ensure the poultry hatchlings are developing properly. In many traditional brooders, the water supply level needs to be visual inspected and the water needs to be manual replenished when the water supply level is low. Moreover, as the poultry hatchlings continue growing, the brooder may be too small for the poultry hatchlings to remain in the same brooder and may have to be moved into a larger brooder to ensure that the poultry hatchlings are being supplied with the proper amount of heat. As such, there is a desire for improvements to be made to traditional brooders to address the issues mentioned above.

The description provided in the background section should not be assumed to be prior art merely because it is mentioned in or associated with the background section. The background section may include information that describes one or more aspects of the subject technology.

SUMMARY

The present disclosure provides systems and methods for rearing poultry hatchlings in a brooder.

According to certain aspects of the present disclosure, a brooder for rearing poultry hatchlings is provided. The brooder includes a heater assembly comprising a heater base. A trough is disposed on the heater base and is formed by an inner wall and an outer wall. A tube is rotatably supported by the inner wall. A dome is adjustably supported on the tube.

According to other aspects of the present disclosure, a method for rearing poultry hatchlings in a brooder is provided. The method includes filling a tube of the brooder with liquid when the tube is in a fill position. The method includes inserting a plug cap into the tube creating a vacuum within the tube. The method include rotating the tube from the fill position to a feed position allowing the liquid to dispense at a controlled rate of flow into a trough of the brooder.

According to other aspects of the present disclosure, a brooder for rearing poultry hatchlings is provided. The brooder includes a heater assembly comprising a heater base. A trough is disposed on the heater base and is formed by an inner wall and an outer wall. A tube is rotatably supported by the inner wall. The tube is in fluid communication with the trough when rotated into a feed position and the tube is sealed from fluid communication with the trough when rotated into a fill position. A dome is adjustably supported on the tube. The dome is adjustably supported on the tube in a clearance fit. The dome is movable along the tube when manual force is applied.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Figure 1:
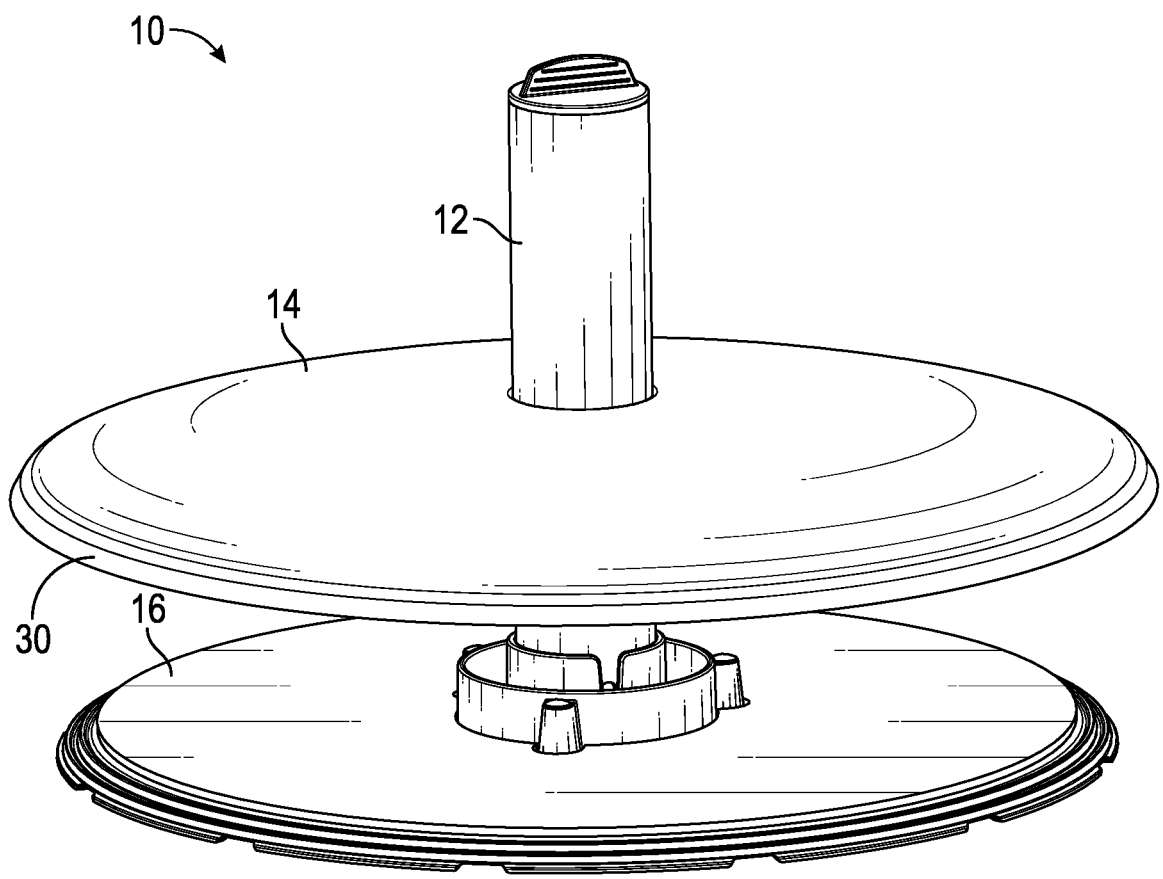
FIG. 1 is a perspective view of an example brooder according to certain aspects of the disclosure.
Figure 2:
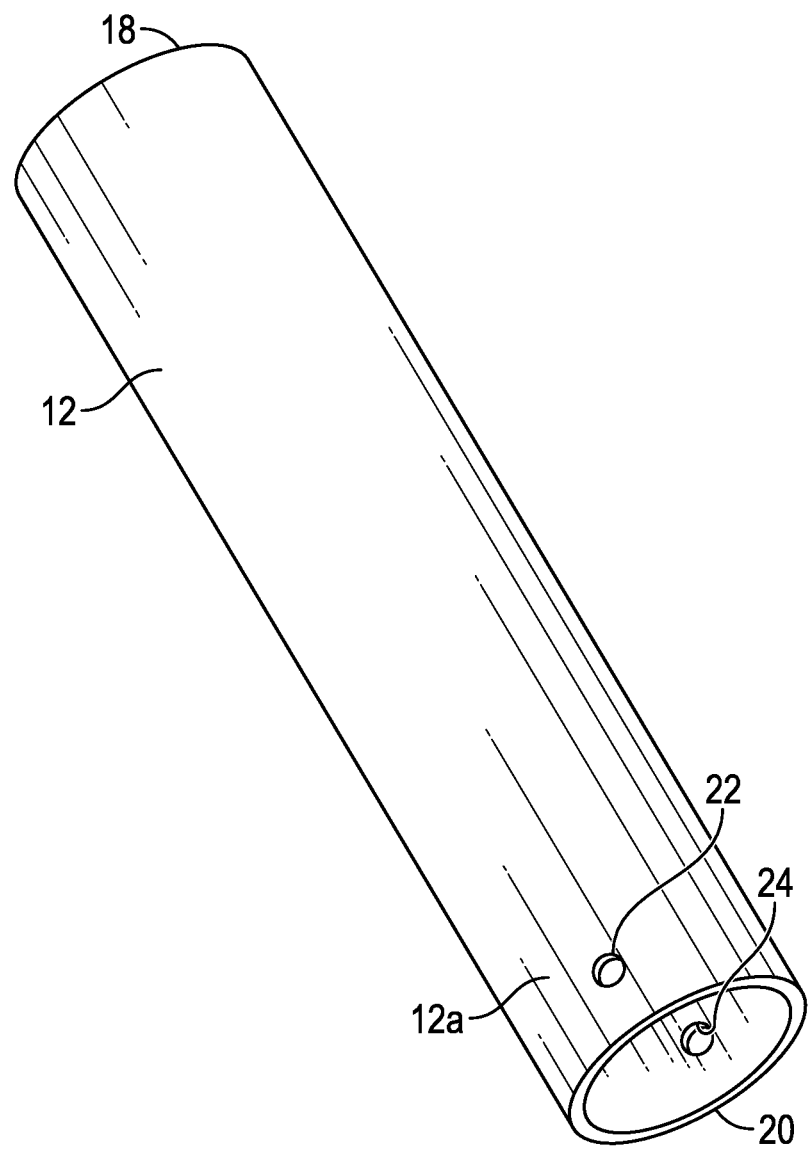
FIG. 2 is a perspective view of a tube of the brooder of FIG. 1, according to certain aspects of the disclosure.
Figure 3:
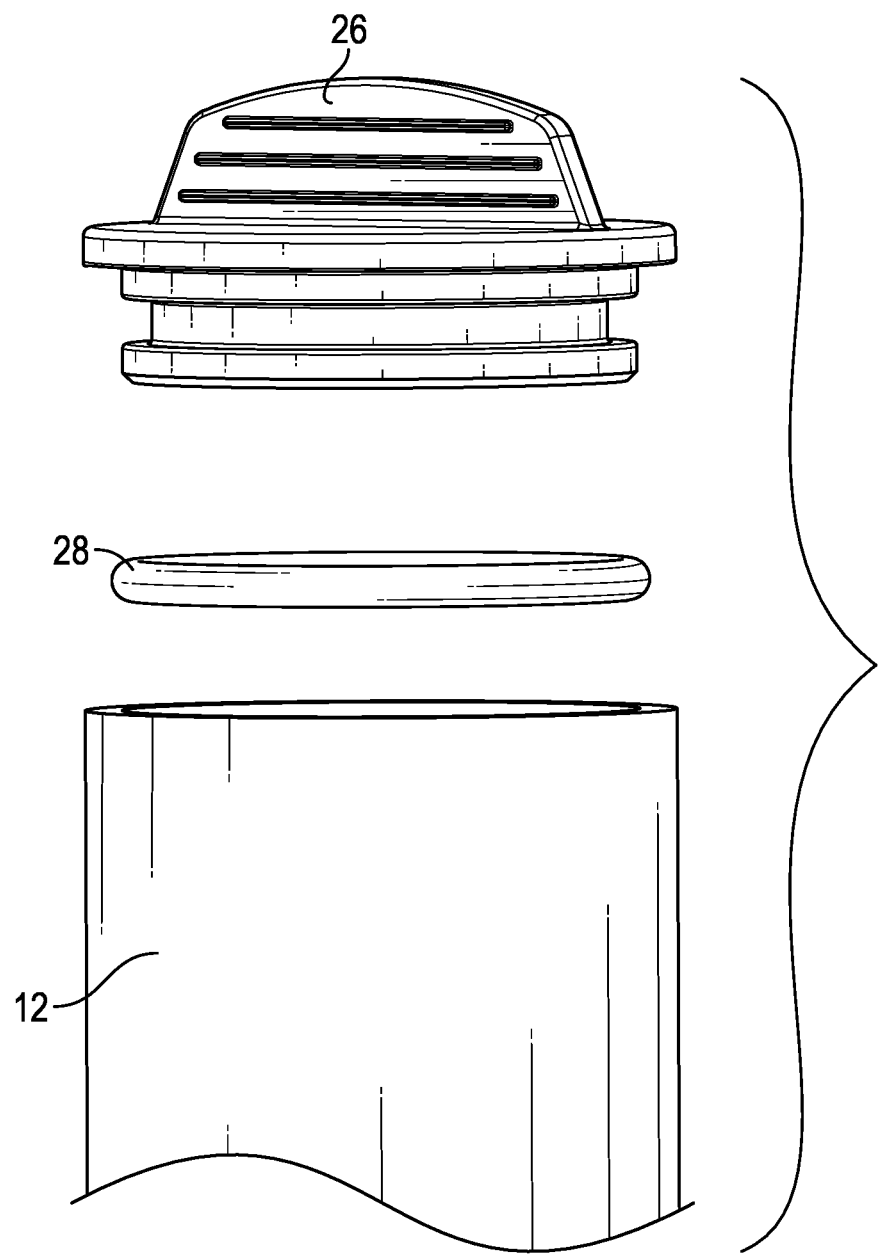
FIG. 3 is an exploded front view illustrating the tube, an O-ring, and a plug cap of the brooder of FIG. 1, according to certain aspects of the disclosure.

FIG. 1 illustrates an example brooder 10 for rearing poultry hatchlings. The brooder 10 includes a tube 12, a dome 14, and a heater assembly 16. With reference to FIG. 2, the tube 12 may be substantially cylindrical and includes a first end 18 and a second end 20. A first aperture 22 and a second aperture 24 are formed through a wall 12a of the tube 12 and face opposite each other. The first aperture 22 and the second aperture 24 are disposed proximate the second end 20 of the tube 12. The tube 12 extends centrally from the heater assembly 16 in a vertical direction relative thereto with the second end 20 of the tube 12 disposed adjacent to the heater assembly 16. Such a configuration allows poultry hatchlings resting on the heater assembly 16 to access a trough 42 (described below) of the heater assembly 16 from all sides thereof. In other embodiments, the tube 12 may extend from a peripheral region of the heater assembly 16. The first end 18 of the tube 12 is configured to receive a plug cap 26, as depicted in FIG. 3. The plug cap 26 includes an O-ring 28 which creates an air tight seal within the tube 12 when the plug cap 26 is inserted into the first end 18 of the tube 12 and the tube 12 is in a fill position.

Referring back to FIG. 1, the dome 14 is adjustably supported on the tube 12 with the tube 12 disposed in a central opening formed in the dome 14 to create an clearance fit. The clearance fit between the dome 14 and the tube 12 is designed in such a manner that the dome 14 supportably rests at any given point along the tube 12, but is slidably movable longitudinally along the tube 12 when manual force is applied to the dome 14. As such, the dome 14 is adjustable along the tube 12 between a first position (see FIG. 10) and a second position (see FIG. 11). The dome 12 may be configured to trap and/or reflect heat generated by the heater assembly 16 in the space between the dome and heater assembly. According to some embodiments, the dome 14 has an outer shape that corresponds to the outer shape of the heater assembly 16. As shown in FIG. 1, for example, the dome 14 is substantially disc shaped and includes an outer rim 30 along the circumference of the dome 14. The dome 14 also may include a convex shape with a rounded outer surface facing towards the first end 18 of tube 12. In such aspects, the convex shape of the dome 14 captures rising heat from the heater assembly 16 and maintains a desired thermal envelope or setpoint temperature between the dome 14 and the heater assembly 16. The convex shape of the dome 14 is configured to discourage poultry hatchlings from roosting atop the dome 14, which can provide an advantage of maintaining the outer surface of the dome 14 free from hatchling droppings and other contaminants. The convex shape of the dome 14 is configured to substantially emulate the natural shape of a hen's wings in a brooding stance. In certain aspects, the dome 14 can be made of a hard plastic material, a polycarbonate, an antimicrobial material, other suitable material forming a rigid, heat resistant cover structure, and combinations thereof.

Figure 4:
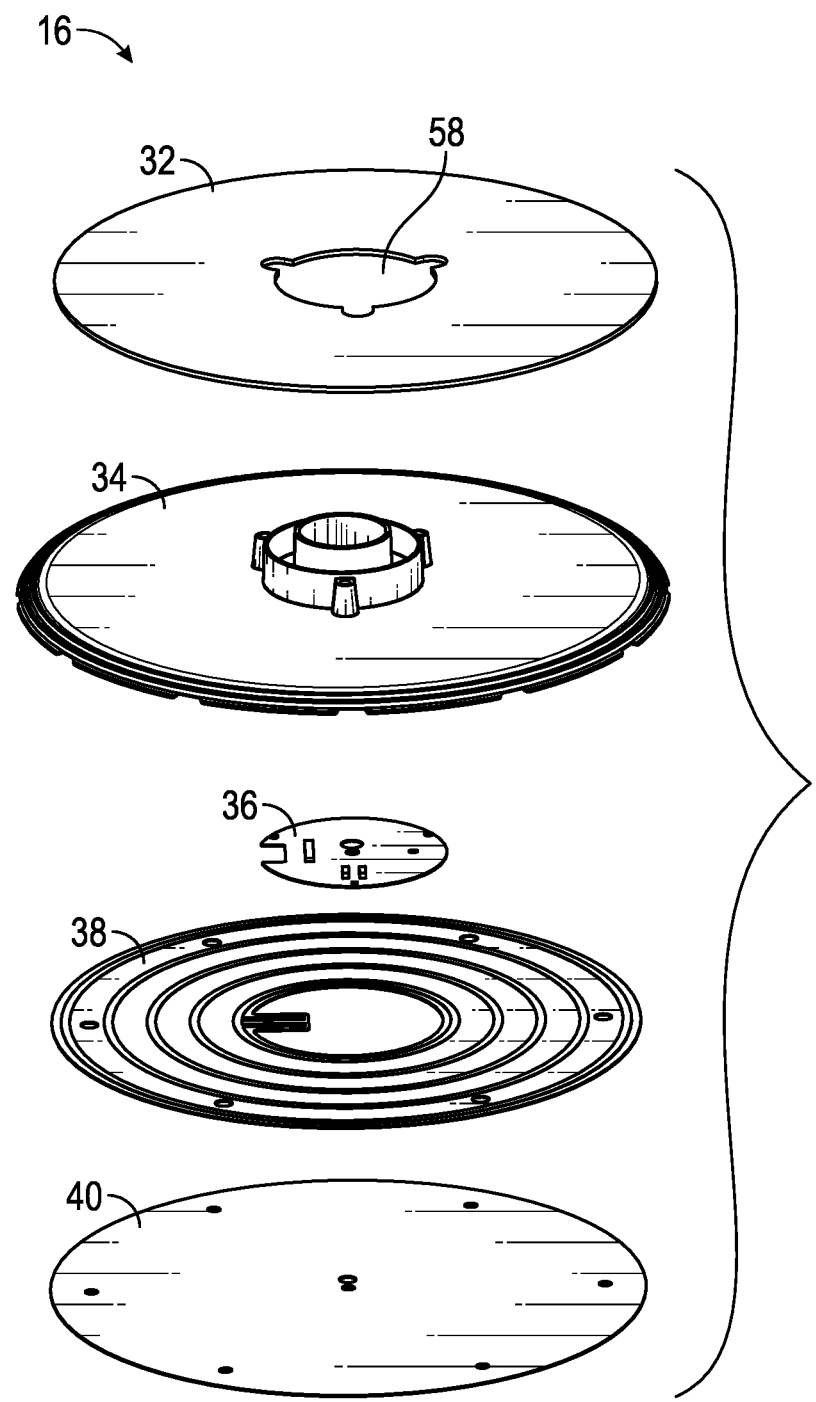
FIG. 4 is an exploded perspective view of the heater assembly of the brooder of FIG. 1, according to certain aspects of the disclosure.
Figure 5:
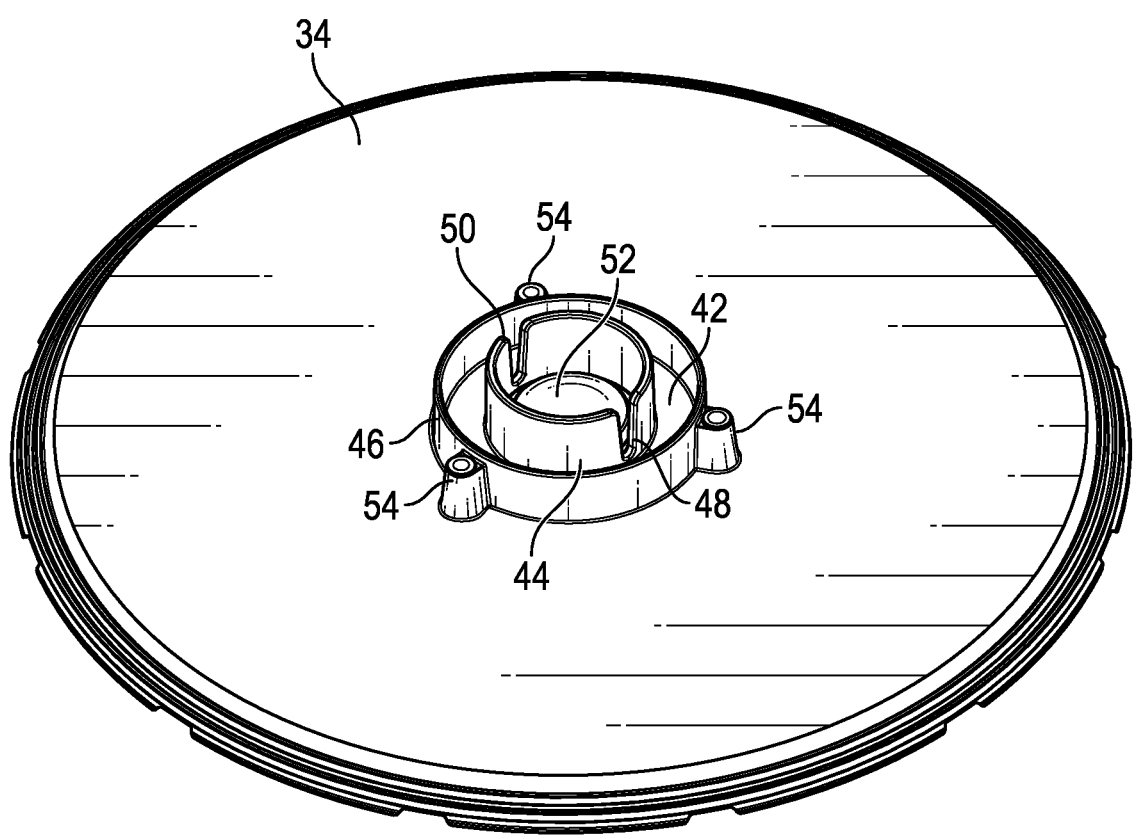
FIG. 5 is a top perspective view of a heater base of the heater assembly of the brooder of FIG. 1, according to certain aspects of the disclosure.

With reference to FIGS. 1 and 4, the heater assembly 16 includes a pad 32, a heater base 34, a printed circuit board (PCB) 36, a heater 38, and a plate 40. As shown in FIG. 5, the heater base 34 includes a trough 42 disposed on the heater base 34. The trough 42 is formed by an inner wall 44 circumscribed by an outer wall 46. The inner wall 44 may be shaped to correspond to a cross section of the tube 12, as described in more detail below. In the illustrated embodiment, the inner wall 44 and the outer wall 46 are cylindrically shaped and extend outwardly from the heater base 34. A first slot 48 and a second slot 50 are formed through the inner wall 44 and face oppositely each other. As will be described in greater detail below, when the tube 12 is in a feed position the first slot 48 aligns with the first aperture 22 of the tube 12 and the second slot 50 aligns with the second aperture 24 of the tube 12.

Figure 6:
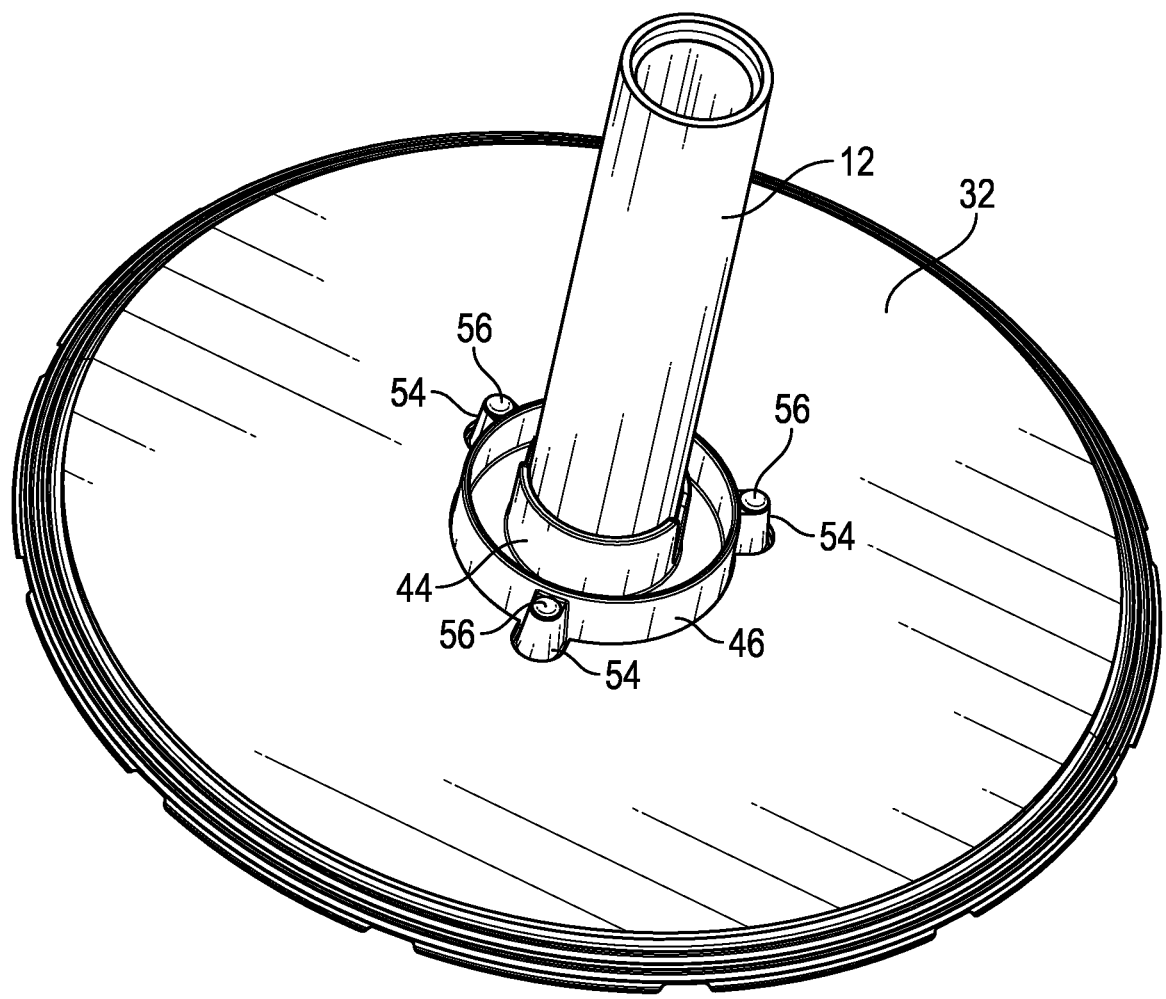
FIG. 6 is a perspective view of the tube in a fill position and a heater assembly of the brooder of FIG. 1 with a dome removed for clarity, according to certain aspects of the disclosure.

The inner wall 44 forms a receptacle 52 for receiving the tube 12 such that the inner wall 44 is in an clearance fit with the tube 12. The clearance fit between the inner wall 44 and the tube 12 is designed so that the inner wall 44 supports the tube 12 while allowing the tube 12 to rotate between the fill position and the feed position with respect to the inner wall 44. As mentioned above, and illustrated in FIG. 6, when the tube 12 is in the feed position the first slot 48 aligns with the first aperture 22 of the tube 12 and the second slot 50 aligns with the second aperture 24 of the tube 12 to allow fluid communication between the tube 12 and the trough 42. In contrast, when the tube 12 is in the fill position, the first aperture 22 and the second aperture 24 are sealed against the inner wall 24, which allows the tube 12 to be filled with liquid (e.g., water) when the plug cap 26 is removed. After the tube 12 is filled with liquid, the plug cap 26 is replaced in the first end 18 of the tube 12 creating a vacuum within the tube 12. Then, when the tube 12 is rotated from the fill position to the feed position so that the first aperture 22 and the second aperture 24 align with the first slot 48 and the second slot 50, respectively, the liquid in the tube 12 begins to disperse into the trough 42 at a controlled rate of flow and the level of the liquid in the trough 42 is maintained at a predetermined level. For example, with the vacuum created within the tube 12 due to seal of the plug cap 26, when the tube 12 is rotated to align the apertures 22, 24 with the slots 48, 50, respectively, pressure within the tube 12 equalizes with the atmospheric pressure as well as with the density of the liquid. In a preferred embodiment, an inner diameter of the tube 12 is 1.750 inches, a length of the tube 12 is 9 inches, the first aperture 22 has a diameter of 0.290 inches and is located at a height of 0.512 inches from a top surface of the heater assembly 16. It should be understood that other suitable dimensions and shapes are within the scope of the present disclosure.

In certain aspects, a plurality of LED housings 54 extend outwardly from the outer wall 46. The plurality of LED housings 54 may be spaced equally apart from each other along the circumference of the outer wall 47. Each LED housing of the plurality of LED housings 54 is designed to house a corresponding LED of a plurality of LEDs 56 disposed on the PCB 36 and extended through the heater base 34 for illuminating the interior space between the dome 12 and the heater assembly 16.

The PCB 36 and heater 38 are disposed between the heater base 34 and the plate 40 and are securely mounted to the plate 40 via screws or other known fastener types. The PCB 36 is powered by an external power source and is in electrical communication with the heater 38 via leads 60 on the heater 38. The heater 38 may be a film heater that includes resistive traces 64 in electrical communication with the leads 60. The heater 38 can be, for example, any type of commercially available heating film having suitable operating temperature and power requirements. In certain aspects, the heater 38 can be, but is not limited to, a circular top and bottom polyester film substrate with printed conductive ink arranged in a grid array therebetween. The heater 38 can be controlled via a bimetal thermostat device. The PCB 36 is configured to control the heater 38 via a processor or controller 59 of the PCB 36 so as to generate desired heat for heating the interior space between the dome 12 and the heater assembly 16. The heater 38 operates at a temperature that can be substantially higher than the resultant temperature at the interior space between the dome 12 and the heater assembly 16. The resultant temperature at the interior space between the dome 12 and the heater assembly 16 is preferably in an operating range of 95 to 103 degrees Fahrenheit, but is not limited to this operating range. In certain aspects, the PCB 36 also includes a heat sink 62 configured to dissipate excess heat generated by the PCB 36 and electrical components mounted thereon. In certain aspects, the PCB 36 also powers the plurality of LEDs 56 to illuminate the space under the dome 12.

The heater base 34 is made of a thermally conductive hard plastic material or other material suitable for conducting heat from the heater 38 such as, but not limited to, Acrylonitrile butadiene styrene (ABS), ABS with antimicrobial properties, polyester elastomer, and polyester elastomer with antimicrobial properties. In particular, when the PCB 36 turns on the heater 38, heat is generated due to current flow through the traces 64. The heat generated by the heater 38 is transferred via the heater base 34 into the space (e.g., envelope) between the dome 12 and the heater base 34. The plate 40 can be made of steel for adding thermal mass to the heater 38 and to control or regulate the thermal stability of the heater base 34 and the envelope. In certain alternative aspects, the plate 40 can be made of a thermally insulating material or may include an insulation layer or a reflective layer adjacent the heater 38 to reduce heat transfer between the heater 38 and the plate 40.

The pad 32 is disposed over and on top of the heater base 34. The pad 32 includes a centrally disposed opening 58 contoured to receive the outer wall 46, and in certain aspects, the plurality of LED housings 54, such that the outer wall 46 and the inner wall 44, and in certain aspects, the plurality of LED housings 54 protrude through the pad 32. In some aspects, the pad 32 is designed to provide proper footing and/or natural surface feel for poultry hatchlings while conducting heat from the heater base 34. For example, the pad 32 can be made of, but is not limited to, coconut fiber (e.g., coir), thermally conductive natural fiber materials or other appropriate materials.

Figure 7:
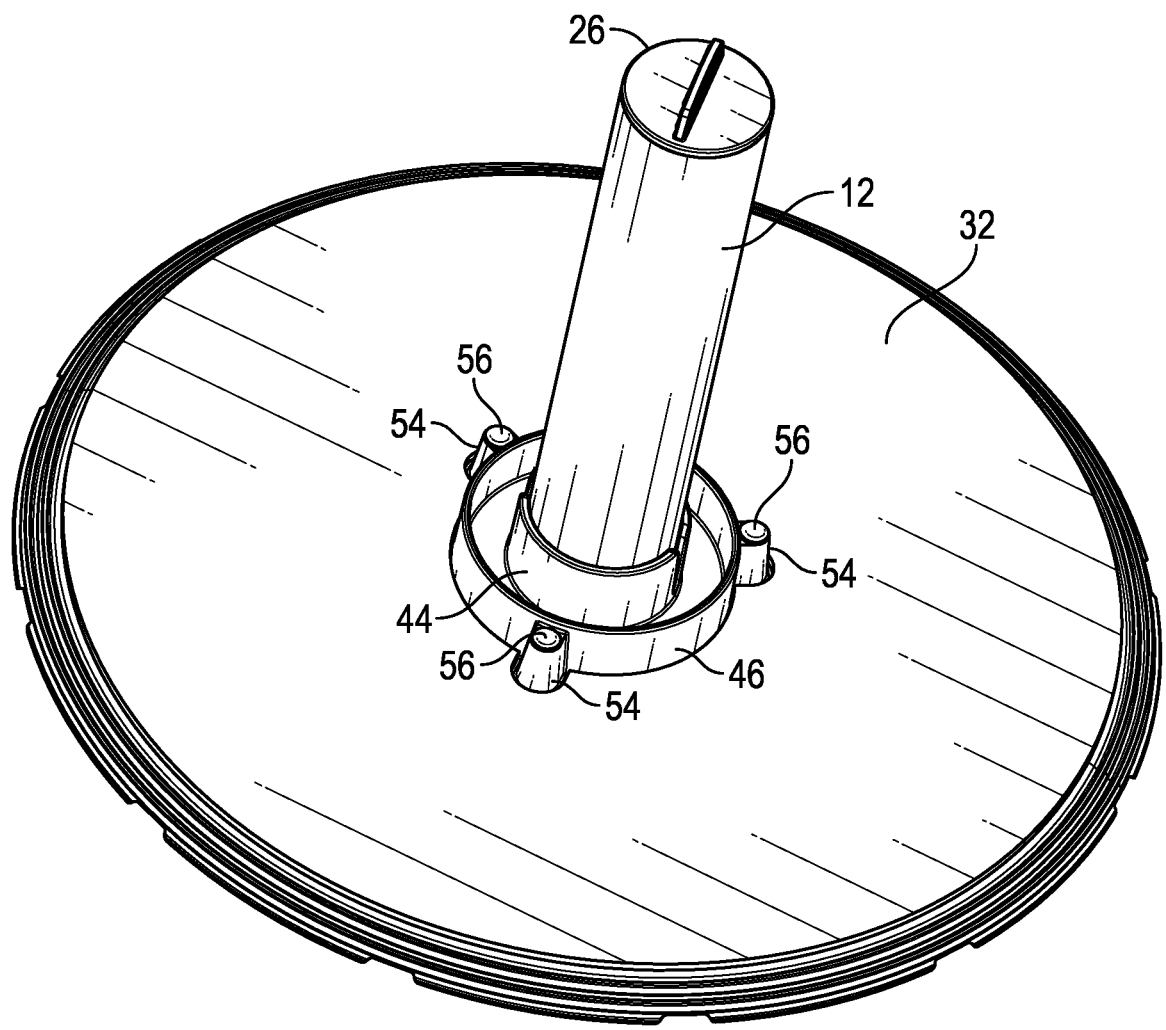
FIG. 7 is a perspective view of the tube in a feed position and a heater assembly of the brooder of FIG. 1 with a dome removed for clarity, according to certain aspects of the disclosure.
Figure 8:
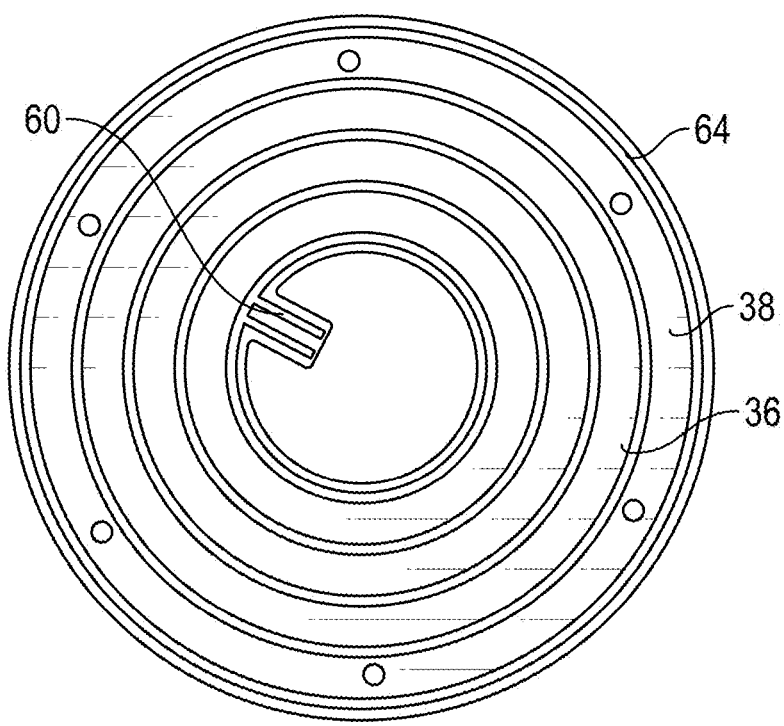
FIG. 8 is a top view of a heater of the heater assembly of the brooder of FIG. 1, according to certain aspects of the disclosure.
Figure 9:
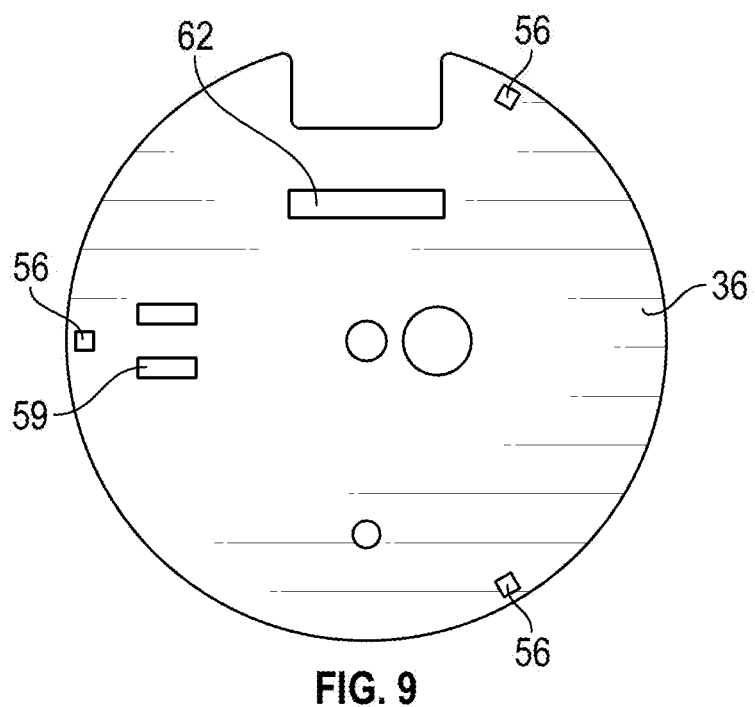
FIG. 9 is a top view of a printed circuit board of the heater assembly of the brooder of FIG. 1, according to certain aspects of the disclosure.
Figure 10:
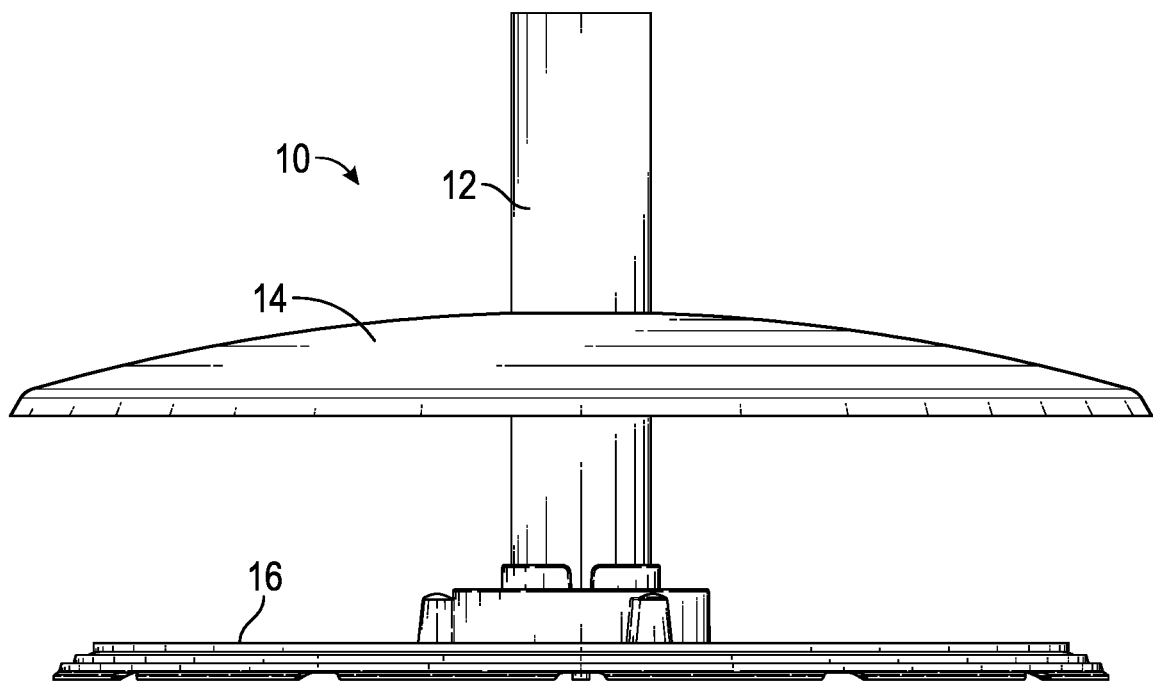
FIG. 10 is a front view of the brooder of FIG. 1 with the dome in a first position, according to certain aspects of the disclosure.
Figure 11:
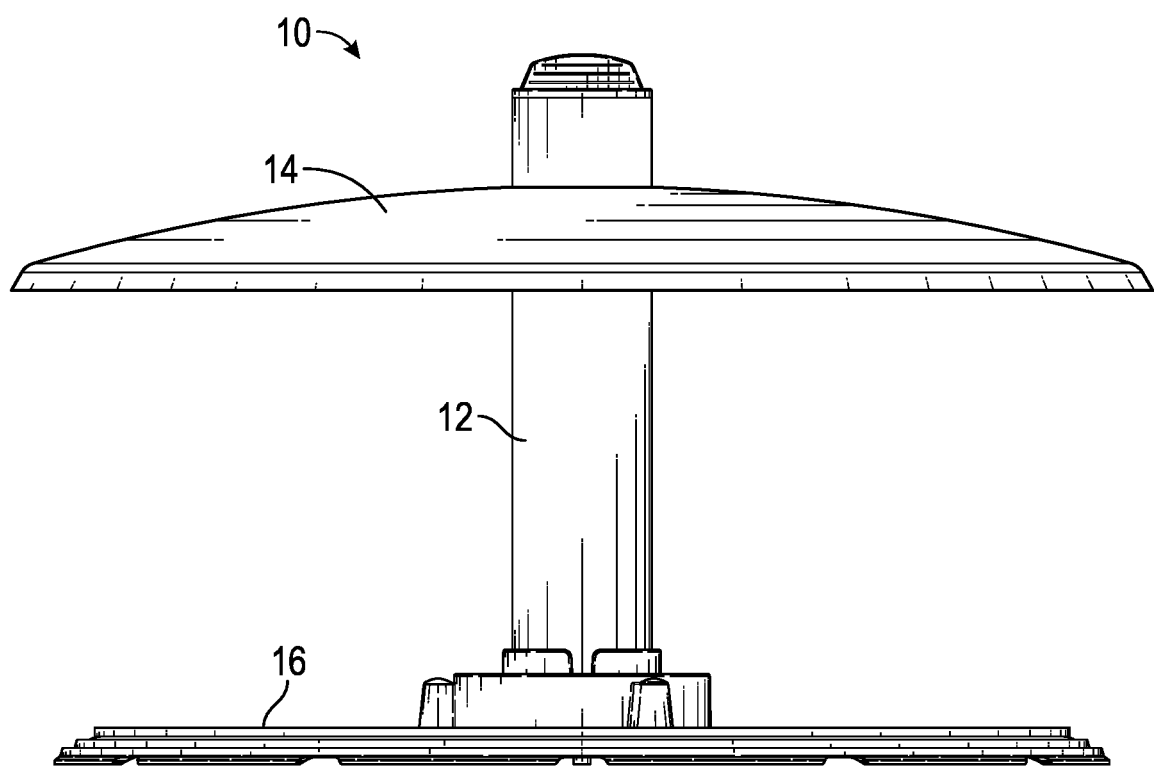
FIG. 11 is a front view of the brooder of FIG. 1 with the dome in a second position, according to certain aspects of the disclosure.

In operation, the tube 12 can be selectively adjusted to be positioned in the first position, as depicted in FIG. 10, which may be at a height sufficient to accommodate newly hatched poultry hatchlings. With the tube 12 positioned in the fill position (see FIG. 6) and the plug cap 26 removed from the first end 18 of the tube 12, liquid is poured into the tube 12 and held within the tube 12 due the first aperture 22 and the second aperture 24 of the tube 12 being sealed against the inner wall 44 creating an air tight seal to maintain the liquid from leaking out. Alternatively, in certain aspects, the tube 12 can be filled with solid feed (e.g., food, poultry feed, feed pellets) instead of liquid. After the desired amount of liquid has been poured into the tube 12, the plug cap 26 is sealing reinserted into the first end 18 of the tube 12 creating a vacuum within the tube 12. With the tube 12 sealed in an air tight manner, the tube 12 is selectively rotated with respect to the inner wall 44, from the fill position to the feed position (see FIG. 7), such that the first aperture 22 and the second aperture 24 of the tube 12 align with the first slot 48 and the second slot 50 of the inner wall 44, respectively. Under Pascal's law, the liquid in the tube 12 will disperse into the trough 42, via the first aperture 22 through the first slot 48 and the second aperture 24 through the second slot 50, in a controlled manner to avoid spilling over the trough 42. The poultry hatchlings will be able to drink from the trough 42, which will be replenished with the liquid in the tube 12 reducing the need to fill the trough 42 manually on a continuous basis. In a similar fashion, when the tube 12 does need to be refilled with liquid, the tube 12 is rotated from the feed position to the fill position to seal the first aperture 22 and the second aperture 24 against the inner wall 44. Once in the fill position, the plug cap 26 is removed from the first end 18 of the tube 12 and liquid is refilled into the tube 12.

Moreover, with the trough 42 filled with the liquid, the PCB 36 can be powered on to generate heat, via the heater 38, which transfers through the heater base 34 and the pad 32 into the space under the dome 12. Additionally, in certain aspects, the PCB 36 also powers the plurality of LEDs 56 to illuminate the space under the dome 12. With the heat captured under the dome 12, the poultry hatchlings can be introduced onto the pad 32 of the brooder 10 to continue development under proper conditions and have access to the liquid. As the poultry hatchlings continue to develop and grow larger, the dome 12 can be selectively adjusted between the first position, exemplarily illustrated in FIG. 10, and the second position, exemplarily illustrated in FIG. 11, to accommodate the height of the growing poultry hatchlings.

Figure 12:
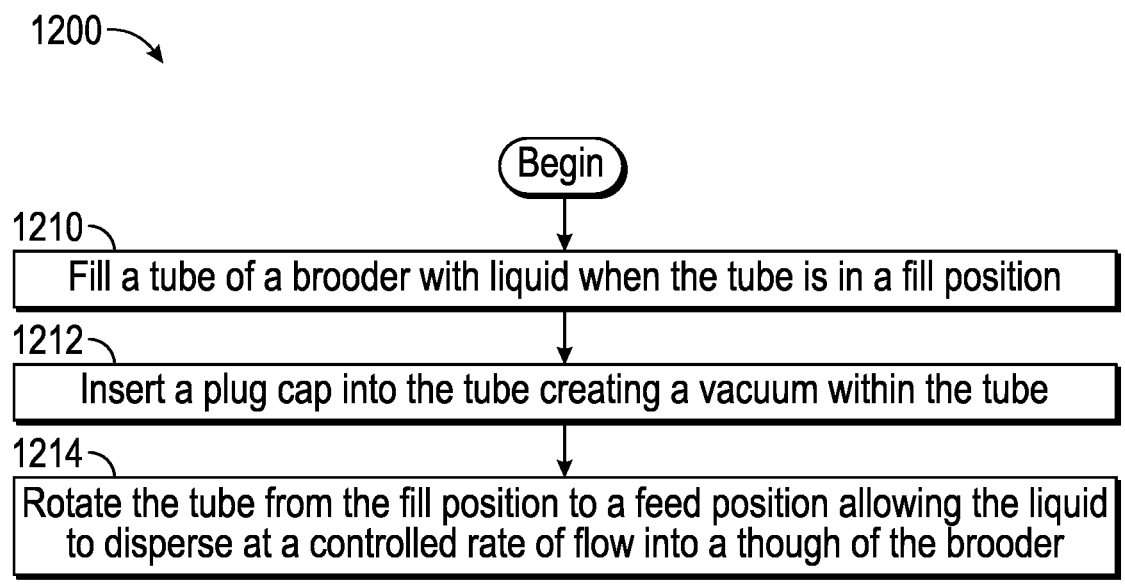
FIG. 12 illustrates an example process rearing poultry hatchlings.

FIG. 12 illustrates an example process 1200 for rearing hatchling poultry in the brooder 10. The process begins at step 1210 by filling the tube 12 of the brooder 10 with liquid when the tube is in the fill position. In certain aspects, the tube 12 of the brooder 10 is filled with solid feed instead of liquid. The process proceeds to step 1212 by inserting the plug cap 26 into the tube 12 creating a vacuum within the tube 12. The process proceeds to step 1214 by rotating the tube 12 from the fill position to the feed position allowing the liquid in the tube 12 to disperse at a controlled rate into the trough 44 of the brooder 10.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A brooder for rearing poultry hatchlings, the brooder comprising:
   a heater assembly comprising a heater base and a heater, wherein the heater comprises resistive traces configured to generate heat to the heater base;
   a trough disposed on the heater base, the trough formed by an inner wall and an outer wall;
   a tube rotatably supported by the inner wall, wherein the tube is in fluid communication with the trough when rotated into a feed position from a fill position aligning a first aperture formed through the tube with a first slot formed through the inner wall of the trough, and the tube is sealed from fluid communication with the trough when rotated from the feed position to the fill position sealing the first aperture of the tube against the inner wall of the trough;
   a pad disposed over the heater base, wherein the pad conducts the heat from the heater base, wherein the pad comprises an opening contoured to receive the inner wall and the outer wall of the trough; and
   a dome adjustably supported on the tube, wherein the heat generated by the resistive traces of the heater is transferred, via the heater base and the pad, into a space between the dome and the heater base.

2. The brooder of claim 1, further comprising a plug cap receivable by the tube, wherein a vacuum is created in the tube when the tube is in the fill position filled with liquid and the plug cap is sealably received by the tube.

3. The brooder of claim 2, wherein the liquid flows at a controlled rate of flow into the trough when the tube is in the feed position.

4. The brooder of claim 2, wherein the plug cap comprises an O-ring.

5. The brooder of claim 1, wherein the tube comprises the first aperture and a second aperture and the inner wall comprises the first slot and a second slot, wherein the first aperture aligns with the first slot and the second aperture aligns with the second slot when the tube is in the feed position.

6. The brooder of claim 5, wherein the first aperture and the second aperture are sealed against the inner wall when the tube is in the fill position.

7. The brooder of claim 1, wherein the dome is adjustably supported on the tube in a clearance fit, wherein the dome is movable along the tube when manual force is applied.

8. The brooder of claim 1, further comprising a printed circuit board in electrical communication with the heater, wherein the printed circuit board and the heater are disposed between the heater base and a plate.

9. A brooder for rearing poultry hatchlings, the brooder comprising:
   a heater assembly comprising a heater base and a heater, wherein the heater comprises resistive traces configured to generate heat to the heater base;
   a trough disposed on the heater base, the trough formed by an inner wall and an outer wall;
   a tube rotatably supported by the inner wall, wherein the tube is in fluid communication with the trough when rotated into a feed position from a fill position aligning a first aperture formed through the tube with a first slot formed through the inner wall of the trough, and the tube is sealed from fluid communication with the trough when rotated from the feed position to the fill position sealing the first aperture of the tube against the inner wall of the trough;

a pad disposed over the heater base, wherein the pad conducts the heat from the heater base, wherein the pad comprises an opening contoured to receive the inner wall and the outer wall of the trough; and a dome adjustably supported on the tube, wherein the dome is adjustably supported on the tube in a clearance fit, wherein the dome is movable along the tube when manual force is applied, wherein the heat generated by the resistive traces of the heater is transferred, via the heater base, into a space between the dome and the heater base.

10. The brooder of claim 9, further comprising a plug cap receivable by the tube, wherein a vacuum is created in the tube when the tube is in the fill position filled with liquid and the plug cap is sealably received by the tube.

11. The brooder of claim 10, wherein the liquid flows at a controlled rate of flow into the trough when the tube is in the feed position.

12. The brooder of claim 9, wherein the tube comprises the first aperture and a second aperture and the inner wall comprises the first slot and a second slot, wherein the first aperture aligns with the first slot and the second aperture aligns with the second slot when the tube is in the feed position.

* * * * *